US010931607B2

(12) United States Patent
Johnson, III et al.

(10) Patent No.: US 10,931,607 B2
(45) Date of Patent: Feb. 23, 2021

(54) URGENCY AND EMOTION STATE MATCHING FOR AUTOMATED SCHEDULING VIA ARTIFICIAL INTELLIGENCE

(71) Applicant: Microsoft Technology Licensing, LLC, Redmond, WA (US)

(72) Inventors: Warren David Johnson, III, Sammamish, WA (US); Charles Yin-Che Lee, Mercer Island, WA (US); Pamela Bhattacharya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/214,675

(22) Filed: Dec. 10, 2018

(65) Prior Publication Data
US 2020/0186482 A1    Jun. 11, 2020

(51) Int. Cl.
*H04L 12/58* (2006.01)
*G06Q 10/10* (2012.01)
(Continued)

(52) U.S. Cl.
CPC ....... *H04L 51/046* (2013.01); *G06Q 10/1095* (2013.01); *G10L 15/22* (2013.01); *G10L 25/63* (2013.01); *H04L 12/1818* (2013.01)

(58) Field of Classification Search
CPC ...... G06F 13/00; G06Q 10/10; G06Q 10/107; G06Q 10/1095; H04L 12/58;
(Continued)

(56) References Cited

U.S. PATENT DOCUMENTS 3,999,050 A * 12/1976 Pitroda ................. G04G 9/0064
708/112
5,093,813 A *  3/1992 Levine .................. H04M 3/432
368/10
(Continued)

FOREIGN PATENT DOCUMENTS

WO    2012048163 A2    4/2012
WO    WO2012048163 A2 *  4/2020    ............. G06Q 10/10

OTHER PUBLICATIONS

Monroy-Hernandez, et al., "How We Built a Virtual Scheduling Assistant at Microsoft", Retrieved https://hbr.org/2017/07/how-we-built-a-virtual-scheduling-assistant-at-microsoft, Jul. 28, 2017, 6 Pages.
(Continued)

*Primary Examiner* — Robert B Harrell

(57) ABSTRACT

In non-limiting examples of the present disclosure, systems, methods and devices for matching user tone to digital assistant response types and tones while assisting with meeting scheduling are presented. An electronic message may be received by a digital assistant service. The digital assistant service may detect an intent to schedule a meeting and identify an urgency level associated with the message. The digital assistant may respond to the scheduling user with a message having a tone corresponding to the identified urgency level. The digital assistant may also perform a follow-up action for scheduling the meeting in a manner consistent with the urgency level of the scheduling user. For example, the digital assistant may attempt to schedule the meeting in a higher priority manner if there is a high urgency associated with the message, and a lower priority manner if there is a low urgency associated with the message.

20 Claims, 9 Drawing Sheets

(51) Int. Cl.
*G10L 15/22* (2006.01)
*G10L 25/63* (2013.01)
*H04L 12/18* (2006.01)

(58) Field of Classification Search
CPC . H04L 12/581; H04L 12/585; H04L 12/5855; H04L 12/5895; H04L 29/08; H04L 51/04; H04L 51/26; H04L 51/046; H04L 12/1818; H04M 1/72519; H04M 1/72547; H04M 1/72552; H04M 1/72583; H04M 88/184; H04M 4/02; H04W 4/00; H04W 4/02; H04W 4/12; H04W 4/14; H04W 68/00; H04W 68/005; G10L 15/22; G10L 25/63
USPC .......................................... 455/466; 709/206
See application file for complete search history.

(56) References Cited

U.S. PATENT DOCUMENTS

| | | | |
|---|---|---|---|
| 8,060,395 | B1 | 11/2011 | Frasher et al. |
| 9,055,415 | B2 | 6/2015 | Toksvig et al. |
| 9,576,574 | B2 | 2/2017 | Van Os |
| 10,078,487 | B2 | 9/2018 | Gruber et al. |
| 2012/0150581 | A1* | 6/2012 | McPhail .............. G06Q 10/109 705/7.19 |
| 2014/0200940 | A1 | 7/2014 | Putterman et al. |
| 2014/0241517 | A1* | 8/2014 | Varoglu ................. H04L 51/24 379/201.01 |
| 2014/0282003 | A1 | 9/2014 | Gruber et al. |
| 2014/0344375 | A1* | 11/2014 | Hauser .................... H04L 51/04 709/206 |
| 2014/0365226 | A1 | 12/2014 | Sinha |
| 2014/0380339 | A1* | 12/2014 | Parker .................... G06F 15/02 719/318 |
| 2015/0178452 | A1 | 6/2015 | Nicolaas et al. |
| 2017/0126753 | A1* | 5/2017 | Gupta ................. H04L 65/403 |
| 2018/0026920 | A1* | 1/2018 | Chen ....................... H04L 51/04 455/466 |
| 2018/0077088 | A1 | 3/2018 | Cabrera-cordon et al. |

OTHER PUBLICATIONS

Somasundaram, Muthu, "New: Schedule Meetings with the Alexa Smart Scheduling Assistant", Retrieved https://aws.amazon.com/blogs/business-productivity/new-schedule-meetings-with-the-alexa-smart-scheduling-assistant/, May 22, 2018, 4 Pages.

"International Search Report and Written Opinion Issued in PCT Application No. PCT/US19/064087", dated Apr. 20, 2020, 10 Pages.

* cited by examiner

URGENCY AND EMOTION STATE MATCHING FOR AUTOMATED SCHEDULING VIA ARTIFICIAL INTELLIGENCE

BACKGROUND

Digital assistants have become integrated with many parts of personal and business tasks. Users have become accustomed to utilizing digital assistants for obtaining directions, checking the weather, and initiating real-time communications with other persons (e.g., finding a contact to call, initiating a phone or video call). As digital assistants have been given access to email functions, calendars, and contact lists, users have started to utilize their digital assistants for scheduling meetings and appointments with other users. However, while digital assistants generally do a good job of responding to commands when those communications are taken at face value, they typically do not take into account some of the context-specific user cues that human assistants generally utilize in efficiently scheduling meetings.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with scheduling meetings. An electronic message may be received by a digital assistant service. When the digital assistant service receives the message, it may analyze it an identify a user intent associated with the message. If a "schedule meeting" intent is identified, the digital assistant service may apply one or more processing models to the message to determine a temporal component associated with the "schedule meeting" intent, and an urgency component/level associated with the "schedule meeting" intent. For example, the digital assistant service may apply a sequence-to-sequence labeling model to the body of the message to determine a timeframe for when the meeting is to take place, and the digital assistant service may apply a binary classification model to the body of the message to determine an urgency level associated with the "schedule meeting" intent. Once the digital assistant service has identified these two components for the message, it may match the urgency level of the message to a response tone/type and perform one or more follow-up actions for scheduling a corresponding meeting based on at least the identified urgency level. In some examples, a stress level of the user associated with the "schedule meeting" intent may also be identified and utilized in determining how to respond to and/or follow-up on the "schedule meeting" intent.

BRIEF DESCRIPTION OF THE DRAWINGS

Non-limiting and non-exhaustive examples are described with reference to the following figures.

DETAILED DESCRIPTION

Figure 1:
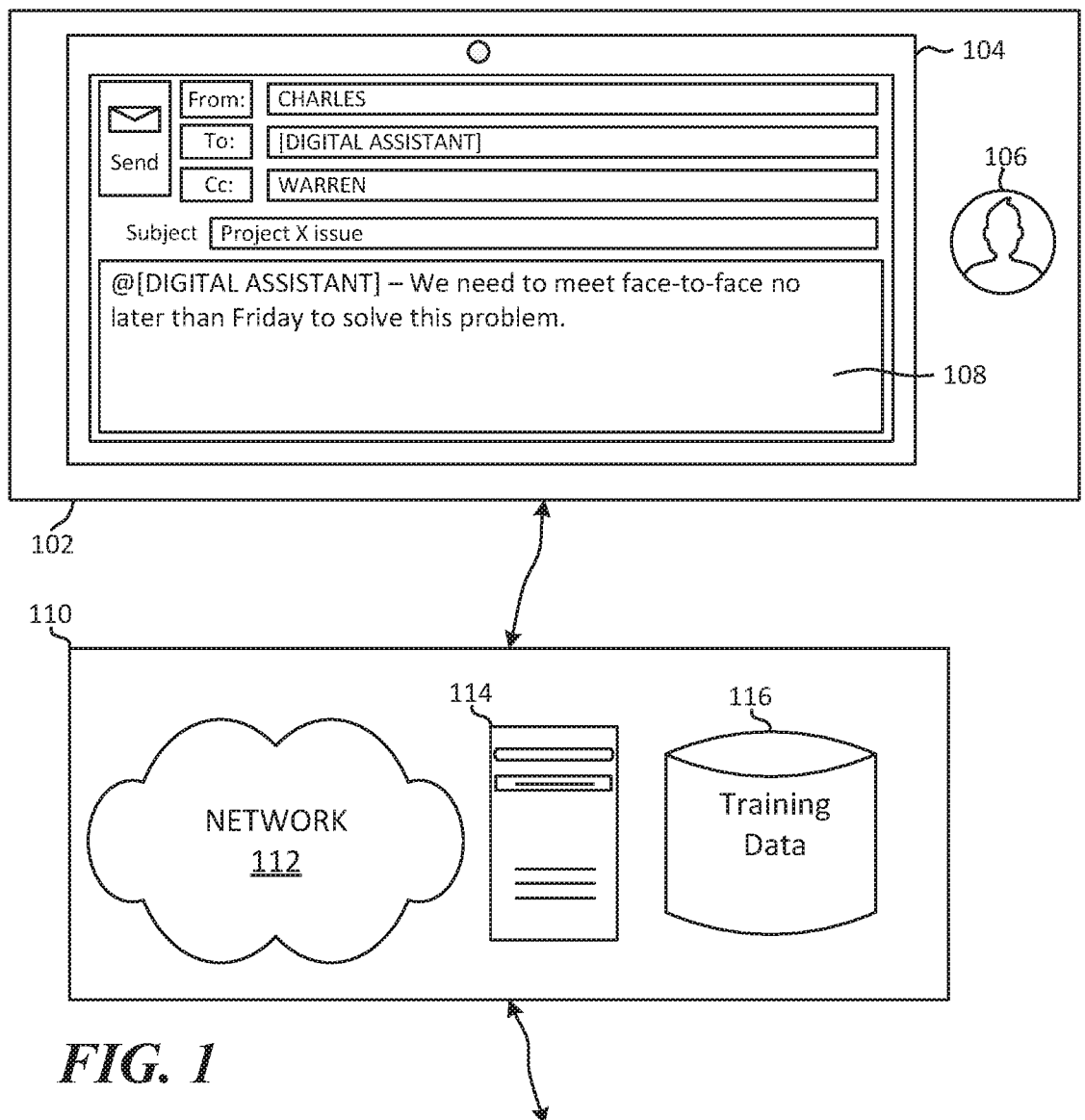
FIG. 1 is a schematic diagram illustrating an example distributed computing environment for assisting with scheduling a meeting utilizing user urgency and emotional state matching processing techniques via a digital assistant service and artificial intelligence, where an "intense tone" is matched to the user urgency and/or emotional state.
Figure 1:
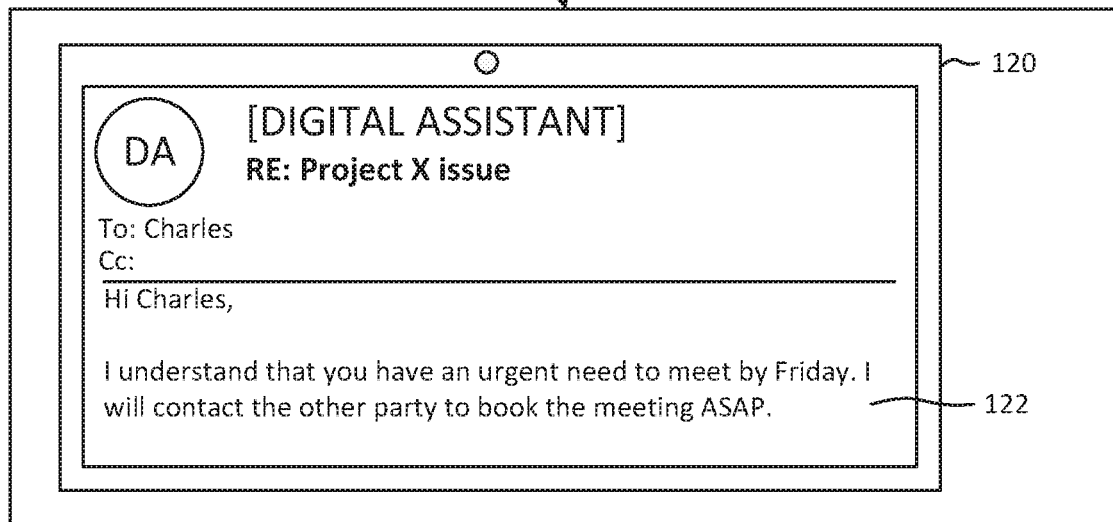

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with scheduling meetings based on analysis of user commands. The user commands may be received as electronic messages, such as mails, text messages, direct digital assistant application messages, and in some examples, verbal commands. In some examples, a digital assistant service may receive an electronic message from a user based on the digital assistant being referenced in the electronic message (e.g., in the body of the electronic message) and/or the digital assistant being explicitly included on the electronic message (e.g., in the "To" field, in the "Cc" field). When the digital assistant service receives the electronic message it may apply one or more natural language processing models to the content of that message and determine a user intent and/or command associated with the message, if the digital assistant service determines that there is a "schedule meeting" intent associated with the message, it may further analyze the textual content in the message, signals associated with the message (e.g., tags, timestamps, domains of users included on the message, etc.), and/or physical/vocal features of the user (e.g., body language, facial expressions, vocal volume) that sent the message, when available, and utilize one or more pieces of that data to determine an urgency level associated with the "schedule meeting" intent, and/or a stress level associated with the user. In analyzing the electronic message, the digital assistant service may apply a first processing model, such as a sequence-to-sequence labeling model, to determine a time occurrence/component associated with a meeting that is to be scheduled, and a second processing model, such as a binary classification model, to determine an urgency level/component associated with the electronic message. One or more of the message processing models may be trained via pre-classified datasets that have been manually classified by humans until a sufficient level of accuracy has been obtained.

Upon determining an urgency level and/or a stress level associated with the electronic message, the digital assistant service may match a response tone to the urgency and/or stress levels that it has identified. For example, if a relatively high urgency level is detected, the digital assistant service may respond to the user with an acknowledgement of that urgency level, respond with different words that may be chosen based on the heightened urgency compared to words that might mean the same but convey a different tone in a less urgent scenario, and/or adjust the cadence or volume of an audible response to match the urgency level. Likewise, if a relatively low urgency level is detected, the digital assistant service may respond to the user in a normal manner, without addressing an urgency of the message, choose more moderate response language, and/or use a lower cadence and/or volume to match the lower urgency level. In sonic examples, a response matrix may be utilized to determine an appropriate response type and/or tone to respond to the user. The matrix may be single-axis (e.g., for urgency or stress), or multi-axis (e.g., for both urgency and stress). In some examples, the digital assistant service may perform follow-up actions in a manner consistent with the identified urgency level and/or stress level. For example, if there is a high level of urgency associated with a message, the digital assistant service may ping potential meeting attendees for necessary meeting information more frequently if they do not provide it immediately. In another example, the digital assistant service may provide more options to potential meeting attendees if there is a relatively low urgency associated with a meeting (e.g., optional dates for having the meeting, optional times for having the meeting, optional durations for having the meeting, etc.).

The systems, methods, and devices described herein provide technical advantages for assisting with scheduling meetings and processing digital assistant commands. According to examples, when the digital assistant service identifies/determines an urgency and/or stress level associated with a "schedule meeting" command, it may prioritize the processing of that command relative to the urgency and/or stress level associated with one or more other "schedule meeting" commands that it has received. Thus, if there is a queue of commands that the digital assistant service has received, messages with a highest urgency and/or stress level associated with them may be moved to the front of the queue. In this manner computer processing costs (CPU cycles) and memory storage costs associated with handling large numbers of commands, or any number of commands being handled in low network speed environments, are efficiently directed to the handling commands that are most urgent. Additionally, by utilizing the digital assistant service to perform follow-up actions based on a level of urgency, processing costs associated with scheduling users having to utilize their client device resources in performing these actions are reduced, in some cases moving those loads to server devices running the digital assistant service, where the actions can be handled more efficiently.

FIG. 1 is a schematic diagram illustrating an example distributed computing environment 100 for assisting with scheduling a meeting utilizing user urgency and emotional state matching processing techniques via a digital assistant service and artificial intelligence, where an "intense tone" is matched to the user urgency and/or emotional state. Computing environment 100 includes meeting command sub-environment 102, network and processing sub-environment 110, and meeting follow-up action sub-environment 118. Each of the computing devices described herein may communicate with one another via a wired or wireless network, such as network 112.

Meeting command sub-environment 102 includes computing device 104, on which user 106 "Charles" has drafted an email 108. A digital assistant is included in the "To" field of email 108 and another user, "Warren", is included in the "Cc" field of email 108. The subject line of email 108 states "Project X issue", and the body of email states: "@[DIGITAL ASSISTANT]—We need to meet face-to-face no later than Friday to solve this problem." When user 106 "Charles" sends email 108, that message may be automatically routed, via network 112, to a digital assistant service based on email 108 including [DIGITAL ASSISTANT] in the "To" field and/or in the message's body. In some examples the digital assistant service may be all or in part cloud-based, and be hosted on one or more server computing devices, such as on server computing device 114 in network and processing sub-environment 110.

The digital assistant service, upon receiving email 108, may extract the text from the subject and body of the message, any tags associated with email 108, and other data that may be associated with the message (e.g., sender identity, receiver identity, timestamp, attachments, etc.). The digital assistant service may apply one or more natural language processing models to the extracted text from email 108 and determine whether there is a command associated with the message. In this example, the digital assistant service determines that there is a meeting intent/command associated with email 108. Once the meeting intent/command has been identified, the digital assistant service may analyze email 108 and determine whether there are parameters included in the message that it can utilize in assisting with scheduling a meeting corresponding to user 106's identified "meeting intent".

In some examples, in identifying the specific intent associated with email 108, and its specific parameters (e.g., meeting time, meeting location, meeting type, etc.), the digital assistant service may process the natural language content in email 108 utilizing one or more models, including: a hierarchical attention model, topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models) In one example, the digital assistant may utilize a sequence-to-sequence model to identify a time parameter associated with email 108, and a binary classification model to identify an urgency level associated with email 108. In some examples, the urgency level may be a value, a percentage of a possible maximum urgency, and/or a ratio of identified urgency to a possible maximum urgency. In additional examples, the urgency level may be categorized based on its value, percentage and/or ratio (e.g., the urgency level may be classified as high, medium, low, etc.). One or more of the processing models applied to email 108 by the digital assistant service may be trained on manually classified datasets, such as datasets in training data store 116. For example, binary classification models may be trained utilizing messages that humans have manually classified the urgency levels for, and sequence-to-sequence models may be manually trained utilizing messages that humans have manually classified various meeting parameters for, such as meeting time and/or duration.

Based on its application of one or more of the various models discussed above, the digital assistant service may make a determination that email 108 has a time parameter associated with it of between the date and time email 108 was sent and/or received (based on a timestamp associated with email 108) and a date corresponding to Friday (the day included in the body of email 108. This time parameter corresponds to a date/time parameter that user 106 would like to have a meeting on Project X with Warren. Based on its application of one or more of the various models discussed above, the digital assistant service may also have determined an urgency level associated with email 108. For example, the phrase "no later than" may correspond to a relatively high urgency level. In examples, the digital assistant service may match a response type to the determined time parameter and/or urgency level. In some examples, the digital assistant service may utilize a matrix in matching the response type to the determine time parameter and/or urgency level, as more fully discussed in relation to FIG. 4. Thus, as in this example, the urgency level is determined to be relatively high, and the digital assistant service responds to Charles in a "tone" that matches that urgency. Thus, as shown on computing device 120 (which may be the same or a different device as computing device 104) in meeting follow-up action sub-environment 118, the digital assistant service has sent user 106, Charles, email 122 in response to email 108, which states: "Hi Charles, I understand that you have an urgent need to meet by Friday. I will contact the other party to book the meeting ASAP." This response is simply for exemplary purposes, and other message types that match the high urgency level of email 108 may additionally or alternatively be utilized.

According to some examples, the digital assistant service may also perform follow-up actions associated with assisting with scheduling a meeting in various manners based on determined urgency of an analyzed message. For example, if a message has a high urgency associated with it, the digital assistant service, the digital assistant service may ping attendees more frequently and/or more times for information it requires for scheduling a meeting than it otherwise would for a message that has a relatively lower urgency associated with it.

The digital assistant service may match a processing priority level to the determined urgency and/or time parameter identified from email 108. For example, because there may be a queue of messages that are to be processed by the digital assistant service, the digital assistant service may prioritize the processing of those messages based on the urgency level and/or temporal parameters associated with those messages. Thus, in some examples, the higher the determined urgency associated with a message, the higher priority the message may have in the digital assistant processing it and thereby responding and/or performing additional follow-up actions. Likewise, the lower the determined urgency associated with a message, the lower priority the message may have in the digital assistant processing it and thereby responding and/or performing additional follow-up actions. In additional examples, the time parameter may additionally or alternatively be a factor that is taken into consideration by the digital assistant service in prioritizing messages to be processed. For example, if it is determined that a user intends for a meeting to be scheduled within a relatively long timespan (e.g., three weeks, three months, etc.), the digital assistant service may prioritize processing of other messages for which users intend for meetings to be scheduled within a relatively shorter timespan (e.g., one week, "no later than Friday", etc.). In this manner, the digital assistant service can efficiently manage the processing costs associated with processing a large number of messages/commands.

Figure 2:
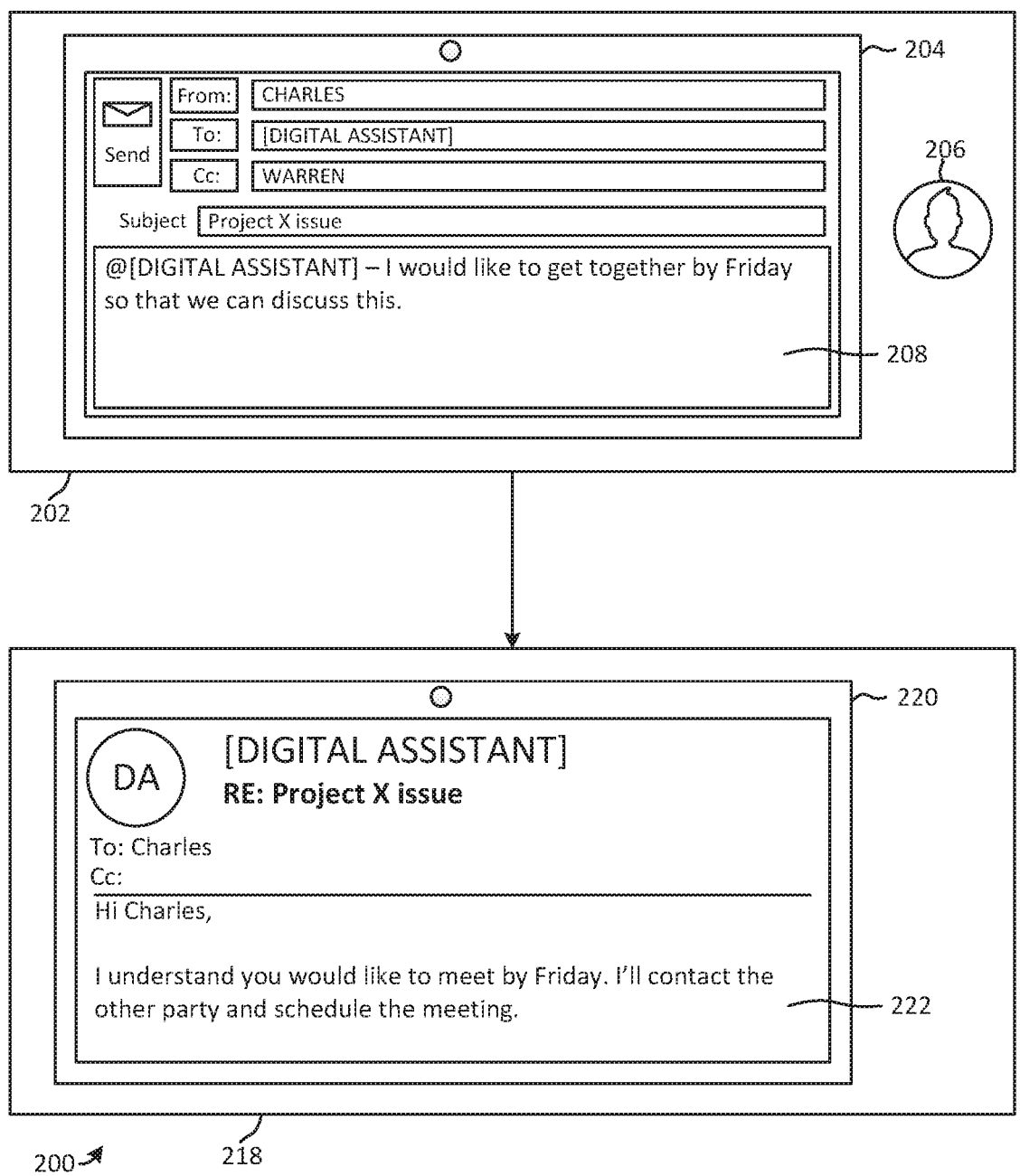
FIG. 2 illustrates another example where a digital assistants service, utilizing artificial intelligence, assists with scheduling a meeting utilizing user urgency and emotional state matching processing techniques, where a "moderate tone" is matched to the user urgency and/or emotional state.

FIG. 2 illustrates another example computing environment 200 where a digital assistants service, utilizing artificial intelligence, assists with scheduling a meeting utilizing user urgency and emotional state matching processing techniques, where a "moderate tone" is matched to the user urgency and/or emotional state. Computing environment 200 includes meeting command sub-environment 202 and meeting follow-up action sub-environment 218. The digital assistant service may reside all or in part on one or more server computing devices, which along with a communication network, are not shown for ease of explanation.

In this example, user 206, "Charles", has composed email 208 on computing device 204. Email 208 includes [DIGITAL ASSISTANT] in the "To" field, another user, "Warren", in the "Cc" field, and the subject line "Project X issue". Thus, for the most part, email 208 is similar to email 108 in FIG. 1. However, email 208 states "@[DIGITAL ASSISTANT]—I would like to get together by Friday so that we can discuss this," When user 206, Charles sends email 208, it may be automatically directed to the digital assistant service based [DIGITAL ASSISTANT] being included in the "Cc" field and/or the @[DIGITAL ASSISTANT] tag being including in the message body. Regardless, when the digital assistant service receives email 208 it extracts the text, tags, and metadata associated with email 208, which is utilized to make a determination as to a user intent/command associated with email 208.

Once the digital assistant service determines that email 208 includes user 206's intent/command to schedule a meeting, the digital assistant service may apply one or more natural language processing models to the extracted text from email 208 to determine one or more parameters associated with the meeting and to determine an urgency level associated with email 208. For example, based on application of a sequence-to-sequence labeling model to the extracted text the digital assistant service may determine that a time parameter for scheduling the meeting is "by Friday", and based on application of a binary classification model to the extracted text the digital assistant service may determine an urgency level associated with email 208. In some examples, one or both of the sequence-to-sequence labeling model and the binary classification model may be trained on manually classified datasets, and the digital assistant service may thus be able to determine the meeting parameters and urgency level to a degree of certainty corresponding to that training.

In this example, in addition to determining that a time parameter for scheduling the meeting is "by Friday", the digital assistant service has determined that there is a low urgency level associated with email 208. As such, the digital assistant matches its response to the low urgency level as is illustrated by email 222 in follow-up action sub-environment 218, which is displayed on computing device 220 (which may be the same or a different computing device as computing device 204). Specifically, email 222, from [DIGITAL ASSISTANT] to user 206, Charles, states: Hi Charles, I understand you would like to meet by Friday. I'll contact the other party and schedule the meeting. Thus, unlike the digital assistant's reply in FIG. 1, email 222 has a lesser degree of urgency associated with it (e.g., it does explicitly acknowledge the urgency associated with the message and it does not include the urgent terminology such as "I will contact the other party to book the meeting ASAP").

Figure 3:
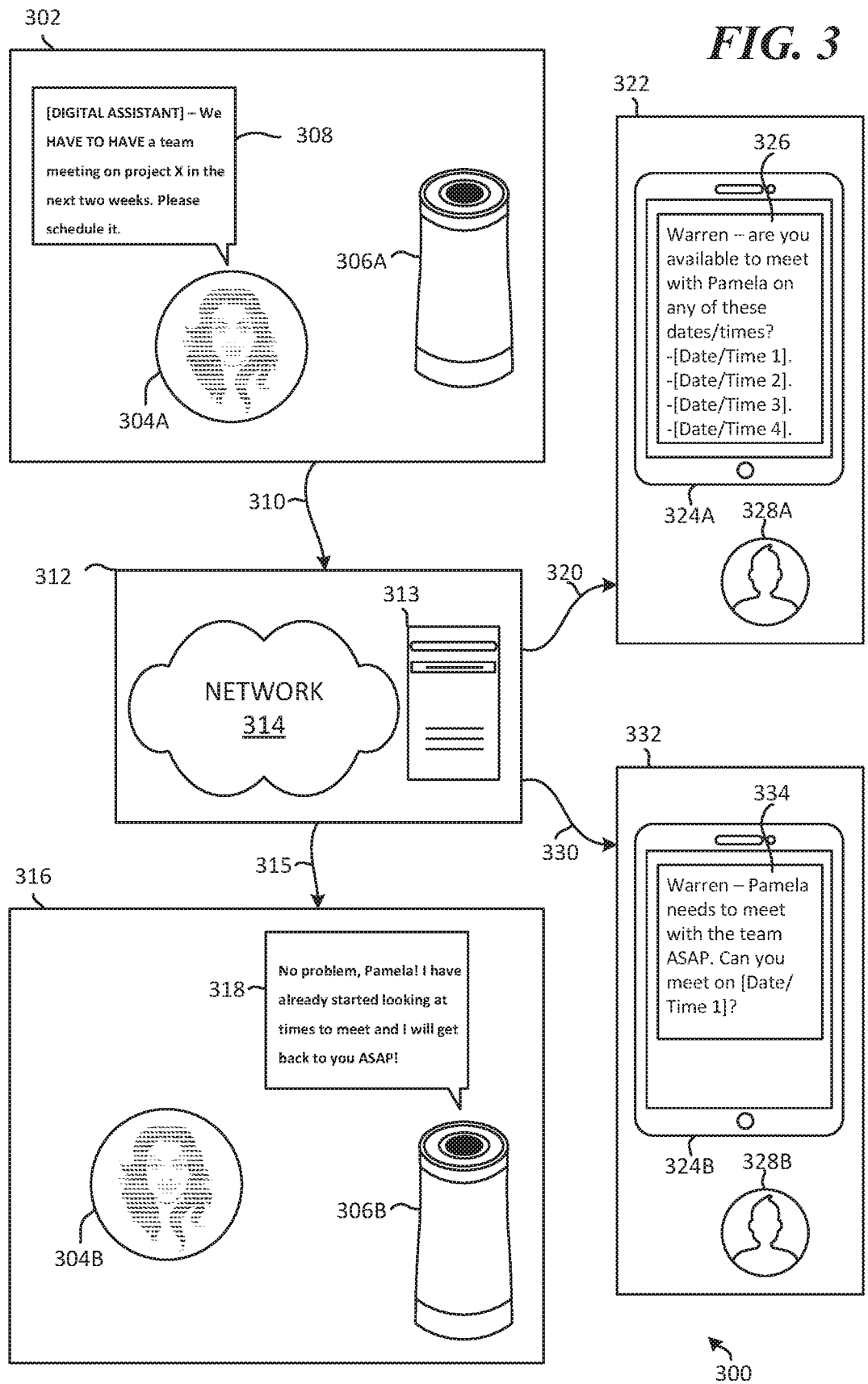
FIG. 3 illustrates a schematic diagram illustrating an example distributed computing environment for identifying urgency and emotional state of a user via a user utterance, and utilizing those attributes in assisting with scheduling a meeting.

FIG. 3 illustrates a schematic diagram illustrating an example distributed computing environment 300 for identifying urgency and emotional state of a user via a user utterance, and utilizing those attributes in assisting with scheduling a meeting. Computing environment 300 includes user utterance sub-environment 302, network and processing sub-environment 312, response sub-environment 316, first follow-up action sub-environment 322 and second follow-up action sub-environment 332.

In user utterance sub-environment 302 user 304A, Pamela, speaking in audible range of digital assistant device 306A, says: "[DIGITAL ASSISTANT]—We HAVE TO HAVE a team meeting on project X in the next two weeks. Please schedule it," as illustrated by utterance 308. The digital assistant device 306A may be able to detect various speech attributes associated with utterance 308, such as frequency and amplitude, which may be utilized to determine a level of urgency associated with utterance 308 and/or a sentient state of user 304A. Thus, when Pamela stresses the words "HAVE TO HAVE" in utterance 308, the digital assistant device 306A may be able to detect that feature and/or send information corresponding to that feature to the digital assistant service for processing.

In some examples, based on user 304A including the term [DIGITAL ASSISTANT] in utterance 308, digital assistant device 306A may receive utterance 306A and transmit it, via network 314, to the digital assistant service, which may reside on one or more server computing devices, such as server computing device 313. Other mechanisms for "waking up" digital assistant device 306A and/or having utterances sent to the digital assistant service, such as interacting with buttons, utilizing other voice commands and keywords, etc., are contemplated herein.

When the digital assistant service receives utterance 308 it may utilize one or more natural language processing models to determine a user intent associated with utterance 308, determine one or more parameters associated with a determined intent, and determine an urgency and/or stress level associated with utterance 308. In this example, the digital assistant service determines that there is a meeting intent/command associated with utterance 308. Once the meeting intent/command has been identified, the digital assistant service may determine whether there are parameters (e.g., meeting time, meeting location, meeting type, etc. included in utterance 308 that it can utilize in assisting with scheduling a meeting corresponding to user 304A's meeting intent. In determining whether there are parameters included in utterance 308 that the digital assistant can utilize in assisting with scheduling the meeting, the digital assistant service may process utterance 308 utilizing one or more models, including: a hierarchical attention model, topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models).

In a specific example, the digital assistant service may utilize a sequence-to-sequence model to identify a time parameter associated with utterance 308, and a binary classification model to identify an urgency level associated with utterance 308. The digital assistant service may additionally or alternatively apply one or more prosodic feature processing models to the speech input to determine an urgency level and/or a stress level associated with utterance 308. The determined urgency level and/or stress level may be a value, a percentage of a possible maximum, and/or a ratio of identified urgency and/or stress to a possible maximum urgency and/or stress. In additional examples, the urgency and/or stress levels may be categorized on their values, percentage and/or ratio (e.g., classified as high, medium, low, etc.). One or more of the processing models applied to utterance 308 by the digital assistant service may be trained on manually classified datasets. For example, binary classification models may be trained utilizing utterances that humans have manually classified the urgency and/or stress levels for, and sequence-to-sequence models may be manually trained utilizing messages that humans have manually classified various meeting parameters for, such as meeting time and/or duration.

In this example, based on application of one or more of the above-described models, the digital assistant service determines that there is a high urgency and or stress level associated with utterance 308. Thus, the digital assistant service identifies a tone and response type that matches that urgency and stress level, and replies via digital assistant device 306B with utterance 318, which states: "No problem, Pamela! I have already started looking at times to meet and I will get back to you ASAP!" Digital assistant device 306A and 306B may be the same or different devices, with digital assistant device 306A receiving utterance 308 from first user 304A, and digital assistant device 306B producing utterance 318 for user 304B. In some examples, based on the high urgency associated with utterance 308, the digital assistant service may prioritize the utterance's processing according to that level. For example, if there is a queue of electronic messages and/or utterances that have been received by digital assistant service for processing, the digital assistant service may prioritize the electronic messages and/or utterances that have a relatively high priority associated with them before the electronic messages and/or utterances that have a relatively lower priority associated with them. In this manner, the digital assistant service can ensure that high priority/urgency messages are responded to quickly when there are limited processing resources available, and then move on to the lower priority messages when there are more processing resources that have been freed up and/or when the high priority/urgency messages have been removed from the queue. In additional examples, the digital assistant service may assign higher processing priority to electronic messages and/or utterances for meetings that have scheduling windows that are closer to the current date and time than for electronic messages and/or utterances for meetings that have scheduling windows that are further to the current date, or that are for longer duration. In additional examples, the digital assistant service may prioritize the processing of electronic messages and/or utterances based on a combination of urgency level and/or when the meeting needs to be scheduled by. In additional examples, the weight of the urgency level on prioritization may be less than, equal to, or greater than the weight of the meeting date/window for a given utterance or electronic message.

In some examples, the digital assistants service may access secondary information associated with one or more of user 304A's account/profile. For example, user 304A may have explicitly provided the digital assistant service with access to her calendar, email, and/or contacts information. As such, when the digital assistant service processes utterance 308, it may identify "project X" from a previous meeting invite, and identify one or more potential attendees for the new meeting that were invited to the previous meeting. In this example, that attendee is Warren 328A/328B. The digital assistants service, with access to user 304A's email and/or contacts information, may identify contact information for second user 328A/328B "Warren", and send an electronic message to one of Warren's accounts and/or devices. In this example, as illustrated by first follow-up action sub-environment 322, the digital assistant sends 320 an electronic message 326 to Warren that is displayed on computing device 324A. Electronic message 326 states: "Warren—are you available to meet with Pamela on any of these dates/times?—[Date/Time 1].—[Date/Time 2].—[Date/Time 3].—[Date/Time 3].—[Date/Time 4]."

According to examples, based on the urgency level associated with an utterance, a stress level associated with an utterance, and/or a date/time that a meeting needs to be scheduled, the digital assistant service may ping a user more or less often for information that the digital assistant service needs to schedule a meeting. For example, if the digital assistant service determines that there is a high level of urgency associated with an utterance and/or electronic message, or that a meeting needs to be scheduled in the near future, the digital assistant service may ping invitees more frequently for information that it needs than for utterances and/or electronic messages that have lower urgency associated with them, or for meetings that can be scheduled further out. Additionally, for utterances and/or electronic messages with higher urgency, stress level, and/or that meetings that need to be scheduled sooner, the digital assistant service may reduce the number of choices that it provides to users in determining information it needs to schedule a corresponding meeting. Thus, in this example where there is a high level of urgency associated with utterance 308, and when second user 328A/328B does not respond to electronic message 326 within a threshold duration of time (which may be shorter because of the urgent nature of the utterance/meeting), the digital assistant service pings user 328A/328B by sending 330 electronic message 334 to user 328A/328B, which is displayed on computing device 324B in second follow-up action sub-environment 332. Electronic message states: "Warren—Pamela needs to meet with the team ASAP. Can you meet on [Date/Time 1]?" Thus, not only does electronic message have fewer choices that it presents to user 328A/328B, but it also includes a level of urgency associated with it corresponding to the urgency of utterance 308.

In some examples, if the digital assistant service determines that there are no available meeting options that meet a meeting request parameter exactly, the digital assistant service may modify one of the request properties that it determines is less prioritized (e.g., duration of meeting, day of the week, etc.). For example, if a user originally requests a one-hour meeting (or if the user's default preference is for one-hour meetings), the digital assistant service may deem that due to the urgency and availability (or lack thereof) of the meeting attendees, the meeting should be booked in a forty-five minute slot because that is the only duration that is mutually available for the attendees.

Figure 4:
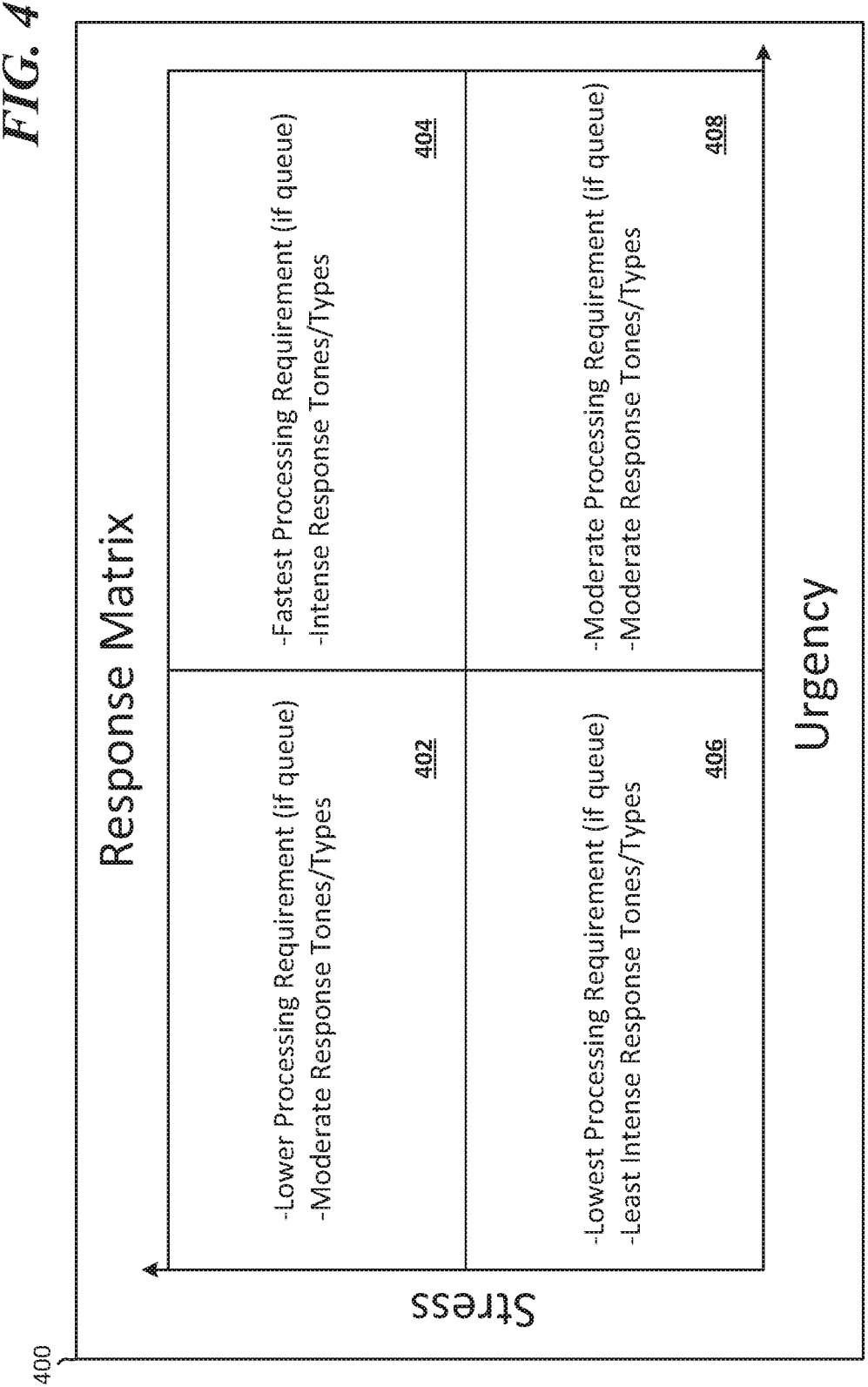
FIG. 4 illustrates an example response matrix that may be utilized by a digital assistant service for identifying appropriate processing requirements and responses for responding to meeting commands based on determined user stress level and meeting urgency.

FIG. 4 illustrates an example response matrix 400 that may be utilized by a digital assistant service for identifying appropriate processing requirements and responses for responding to meeting commands based on determined user stress level and meeting urgency. Response matrix 400 includes a user's urgency level on the X-axis and a user's stress level on the Y-axis. Response matrix 400 includes four quadrants, each of which is associated with at least one response tone and/or type and at least one processing requirement for processing a user's "schedule meeting" command based on a user's detected stress level and urgency level in association with the user's "schedule meeting" command.

In response to plotting a user's "schedule meeting" command in first quadrant 402, which corresponds to a user's high stress level but low urgency level associated with the "schedule meeting" command, the digital assistant service may respond to the user with a relatively moderate response tone/type. Additionally, in response to plotting a user's "schedule meeting" command in first quadrant 402, the digital assistant service may assign a relatively lower priority to processing the command in relation to other user commands that have been received by the digital assistant service. In some examples, the relatively lower processing priority assigned to commands in first quadrant 402 may be relatively higher than for commands plotted in third quadrant 406, but relatively less than for commands plotted in second quadrant 404 and fourth quadrant 408.

In response to plotting a user's "schedule meeting" command in second quadrant 404, which corresponds to a user's high stress level and high urgency level associated with the "schedule meeting" command, the digital assistant service may respond to the user with a relatively intense response tone/type. Additionally, in response to plotting a user's "schedule meeting" command in second quadrant 404, the digital assistant service may assign a highest priority to processing the command in relation to other user commands that have been received by the digital assistant service. The highest processing priority assigned to commands in second quadrant 404 may be relatively higher than for commands plotted in each of first quadrant 402, third quadrant 406, and fourth quadrant 408.

In response to plotting a user's "schedule meeting" command in third quadrant 406, which corresponds to a user's low stress level and low urgency level associated with the "schedule meeting" command, the digital assistant service may respond to the user with a least intense response tone/type. Additionally, in response to plotting a user's "schedule meeting" command in third quadrant 406, the digital assistant service may assign a lowest priority to processing the command in relation to other commands that have been received by the digital assistant service. The lowest processing priority assigned to commands in third quadrant 406 may be relatively lower than for commands plotted in each of first quadrant 402, second quadrant 404, and fourth quadrant 408.

In response to plotting a user's "schedule meeting" command in fourth quadrant 408, which corresponds to a user's low stress level but high urgency level associated with the "schedule meeting" command, the digital assistant service may respond to the user with a relatively moderate response tone/type. Additionally, in response to plotting a user's "schedule meeting" command in fourth quadrant 408, the digital assistant service may assign a relatively moderate priority to processing the command in relation to other commands that have been received by the digital assistant service. The relatively moderate processing priority assigned to commands in fourth quadrant 408 may be relatively lower than for commands in second quadrant 404, but relatively higher than for each of first quadrant 402 and third quadrant 406.

Figure 5:
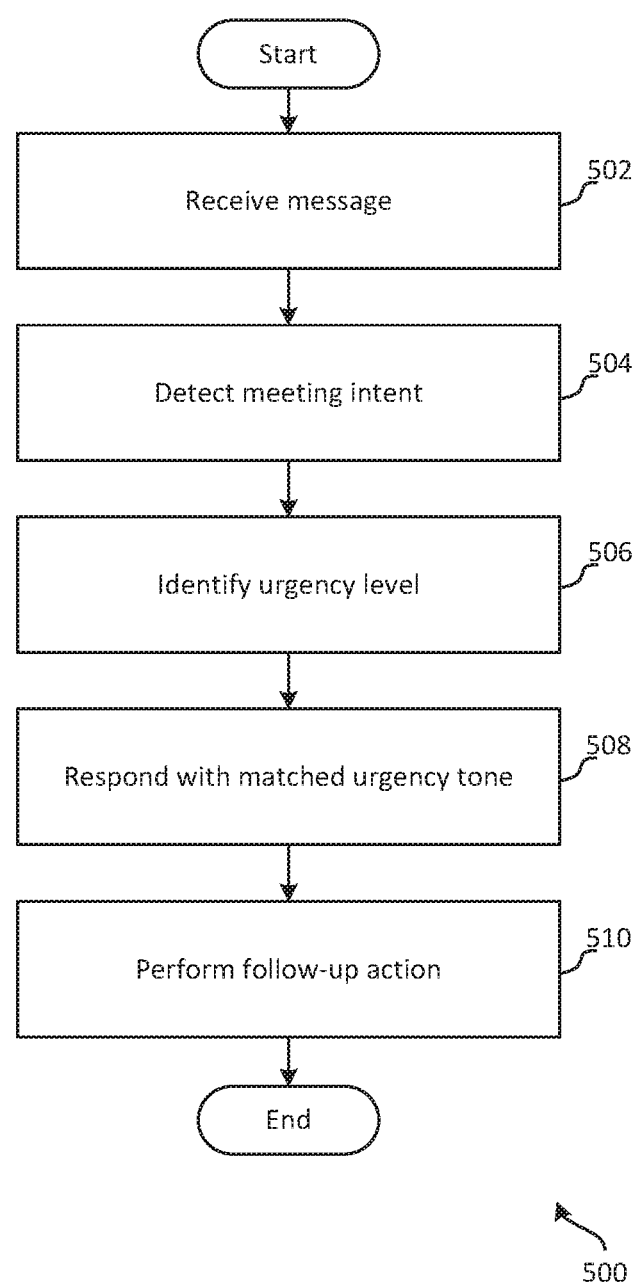
FIG. 5 is an exemplary method for assisting with scheduling a meeting.

FIG. 5 is an exemplary method 500 for assisting with scheduling a meeting. The method 500 begins at a start operation and flow continues to operation 502.

At operation 502 an electronic message is received from a scheduling user. The message is received by a digital assistant service. In sonic examples, the message may be received via an email or other electronic message input, an input field in an operating system, etc. In some examples, the message only includes natural language. In other examples, the message may include natural language, such as the language in the body of an email, and additional information. The additional information may include one or more tags or information input into one or more fields (e.g., "To" field, "Cc" field, location tag, meeting type tag, etc.), and attachments. In some examples, the additional information may additionally or alternatively include metadata, such as timestamps associated with creation of a message, timestamps associated with editing the message, and the like.

From operation 502 flow continues to operation 504 where an intent to schedule a meeting is detected from the electronic message. In examples, the intent to schedule the meeting may be detected by analyzing one or more tags associated with the message (e.g., a schedule meeting tag, a meeting location tag). In other examples, the intent to schedule the meeting may be detected based on the message being addressed to the digital assistant and/or the digital assistant being included in the body of the message (i.e., the digital assistant's primary use may be meeting scheduling). In still other examples, the intent to schedule the meeting may be detected based on application of one or more natural language processing models to the message and/or a combination of the above.

In addition to detecting an intent to schedule a meeting, the digital assistant service may identify one or more meeting parameters associated with the meeting. For example, the digital assistant, via application of one or more processing models, may identify a location where the meeting is to take place, a time when the meeting is to take place, date when the meeting is to take place, a temporal window when the meeting is to take place, attendees that are to attend the meeting, a meeting type, etc. In examples, the digital assistant service may apply one or more of the following models in identifying one or more meeting parameters associated with the electronic message: a hierarchical attention model, topic detection using clustering, hidden Markov models, maximum entropy Markov models, support vector machine models, decision tree models, deep neural network models, general sequence-to-sequence models (e.g., conditional probability recurrent neural networks, transformer networks), generative models, recurrent neural networks for feature extractors (e.g., long short-term memory models, GRU models), deep neural network models for word-by-word classification, and latent variable graphical models).

From operation 504 flow continues to operation 506 where an urgency level associated with the electronic message is identified. One or more of the above-discussed models may be applied to the message in determining an urgency level associated with the message, in some examples, a user may manually tag the message with an urgency level and the digital assistant may automatically characterize the message utilizing that tag. In a specific example, the digital assistant service may utilize a binary classification model to identify the urgency level associated with the message. In some examples, an emotional state and/or stress level of the user that sent the message may be determined by the digital assistant service based on application of one or more sentient analysis models applied to the electronic message. The emotional state and/or stress level of the user may be identified in addition or alternatively to determining the urgency level associated with the message.

From operation 506 flow continues to operation 508 where a response to the electronic message is sent to the scheduling user in a tone corresponding to the urgency level identified from the electronic message. In some examples, the tone of the response may be matched to the identified urgency level and/or stress level based on application of one or more matrix, such as described above in relation to FIG. 4. In examples where a single one of a stress level or an urgency level is identified by the digital assistant service, a linear matrix (e.g., a single axis) may be applied. For example, if only an urgency level associated with the message is identified, responses having a tone along a single urgency axis may be matched against the identified urgency level. Likewise, if only a stress level associated with the user is identified, responses having a tone along a single stress axis may be matched against the identified stress level for the user. Alternatively, if both a stress level and an urgency level are identified by the digital assistant service, a multi-axis matrix may be utilized to identify an appropriate response by the digital assistant service. Other mechanisms for matching a response tone to urgency and/or stress levels are contemplated (applying score values to urgency and/or stress levels, matching score values of urgency and/or stress levels to response types/tones, weighted urgency and/or stress levels, etc.).

From operation 508 flow continues to operation 510 where one or more follow-up actions for scheduling the meeting are performed by the digital assistant service. In some examples, the type and/or mechanism of performing the follow-up actions may be dictated by the urgency and/or stress levels associated with the message and/or user. For example, the digital assistant service may send a message to one or more users that are to attend a meeting that is being scheduled, and based on a heightened identified urgency and/or stress level, the digital assistant service may ping those users more frequently for necessary information if they do not reply. In another example, the digital assistant service may send more time and/or date options to potential meeting attendees when there is a relatively low urgency and/or stress level associated with a "schedule meeting" message, and the digital assistant service may send less options to potential meeting attendees when there is a relatively higher urgency and/or stress level associated with a "schedule meeting" message.

From operation 510 flow continues to an end operation, and the method 500 ends.

Figure 6:
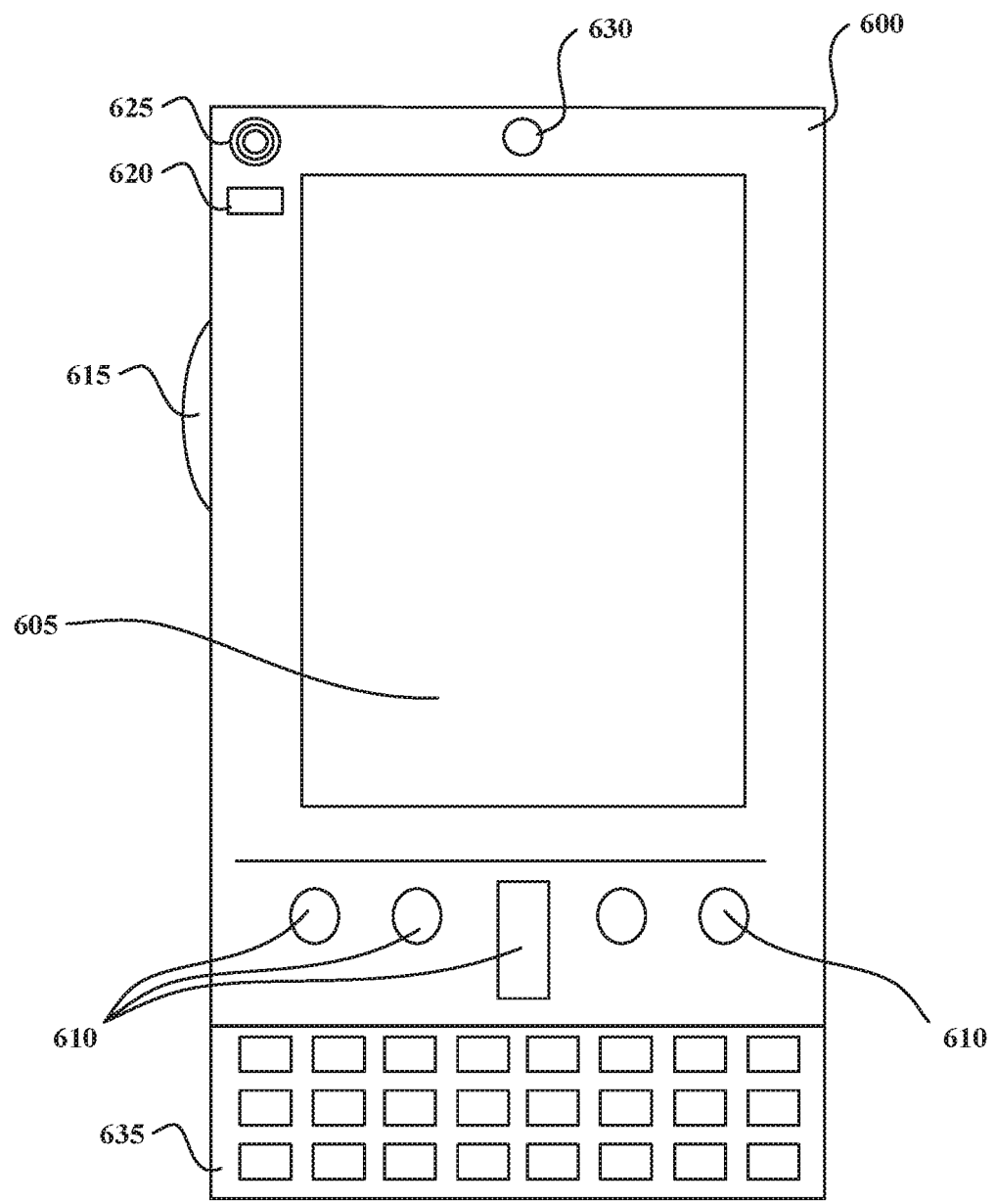
FIGS. 6 and 7 are simplified diagrams of a mobile computing device with which aspects of the disclosure may be practiced.
Figure 7:
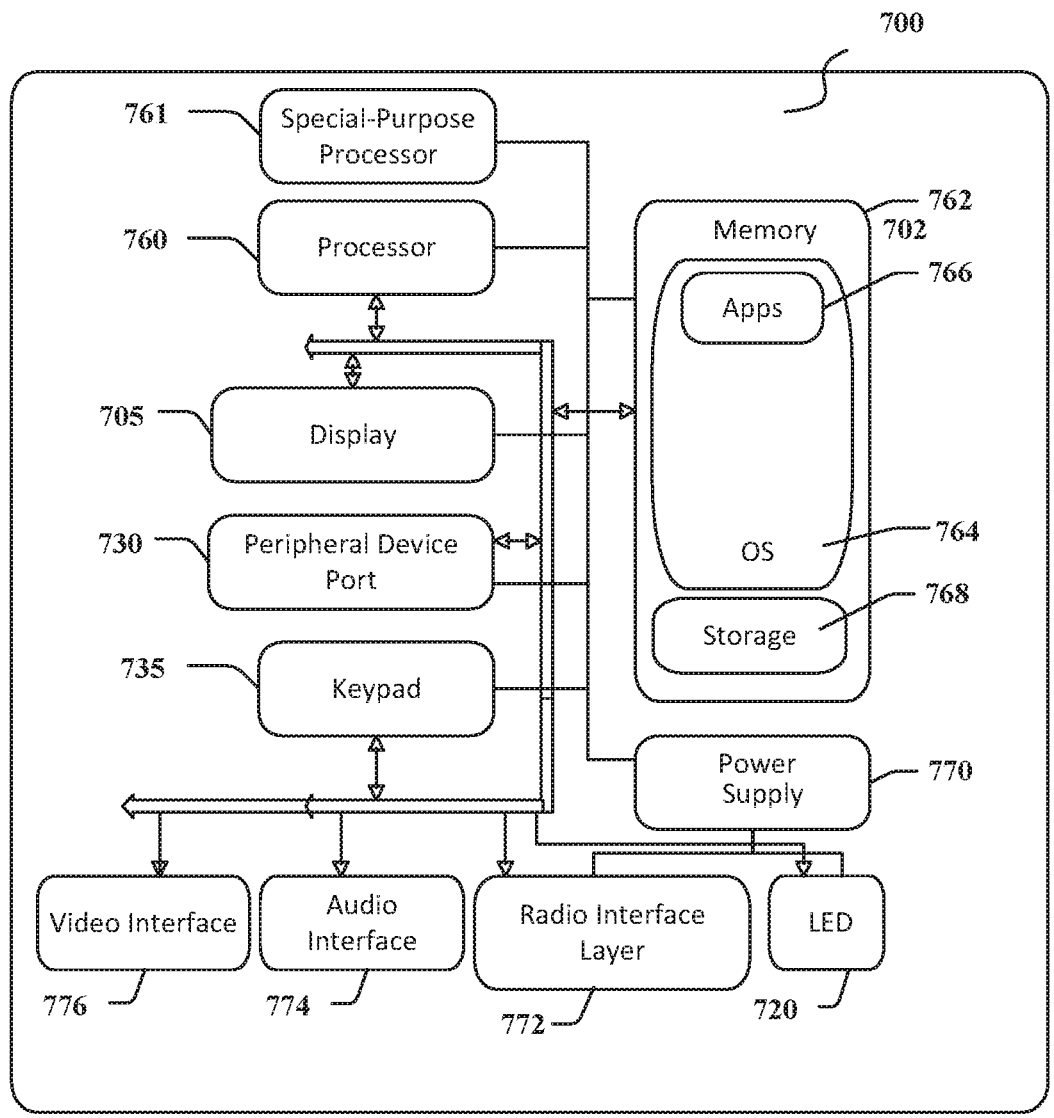

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
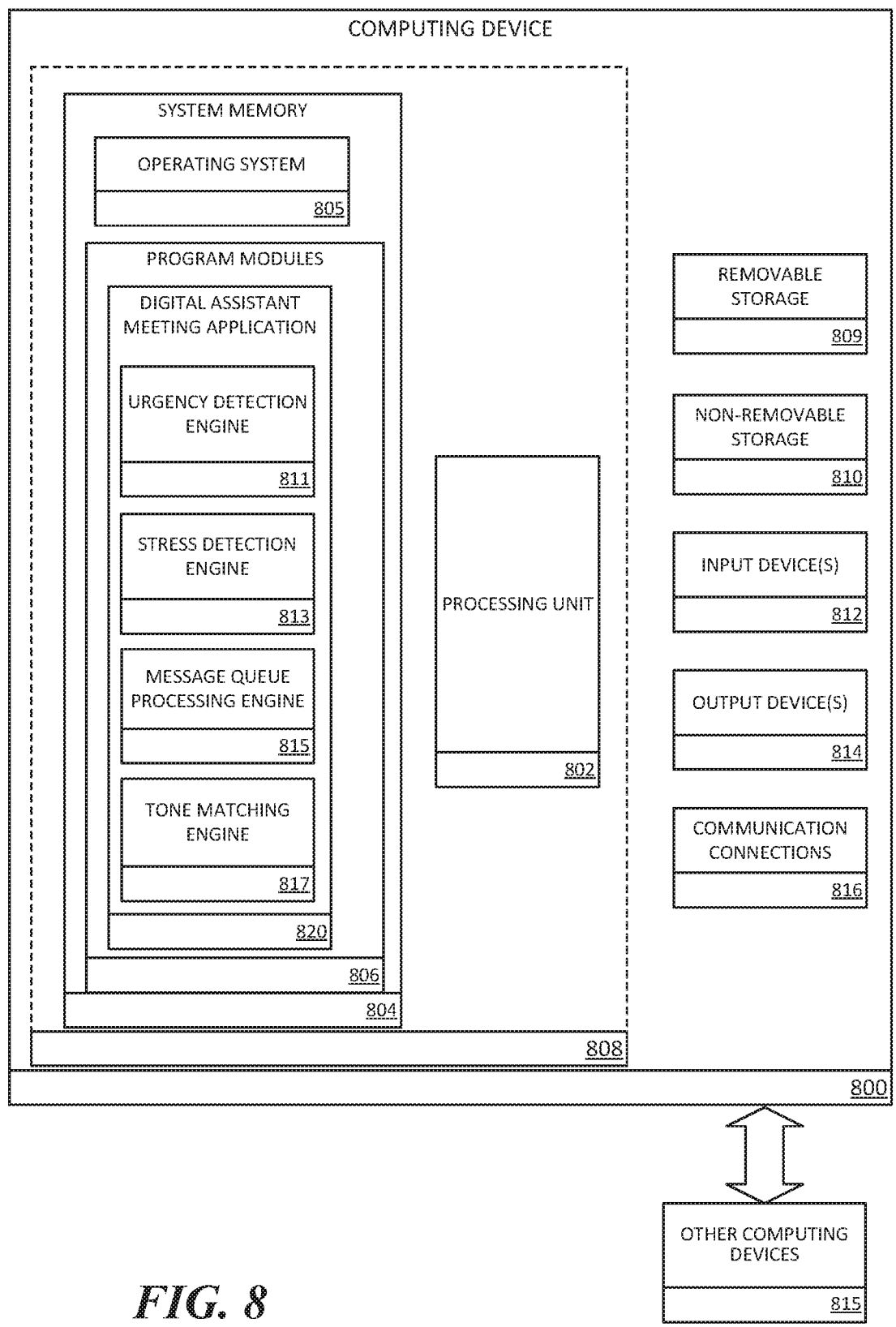
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with scheduling a meeting. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more digital assistant programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., digital assistant meeting application 820) may perform processes including, but not limited to, the aspects, as described herein. According to examples, urgency detection engine 811 may perform one or more operations associated with applying one or more language processing models to natural language in a message and determining an urgency level associated with scheduling of a meeting. Stress detection engine 813 may perform one or more operations associated with determining a stress level associated with a user that has sent a "schedule meeting" command to the digital assistant service. Stress detection engine 813 may analyze lexical and/or prosodic features of the command in determining the stress level. Stress detection engine 813 may additionally or alternatively analyze facial expressions, physical mannerisms, heart rate, etc. of the user in determining the user's stress levels. Message queue processing engine 815 may perform one or more operations associated with assigning a relative priority in processing to commands received by the digital assistant service based at least on an urgency level associated with one or more of the received commands. Tone matching engine 817 may perform one or more operations associated with matching a response tone and/or a response type to a received meeting command based on an identified urgency level and/or stress level associated with the meeting command and/or user that sent the meeting command.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (MD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
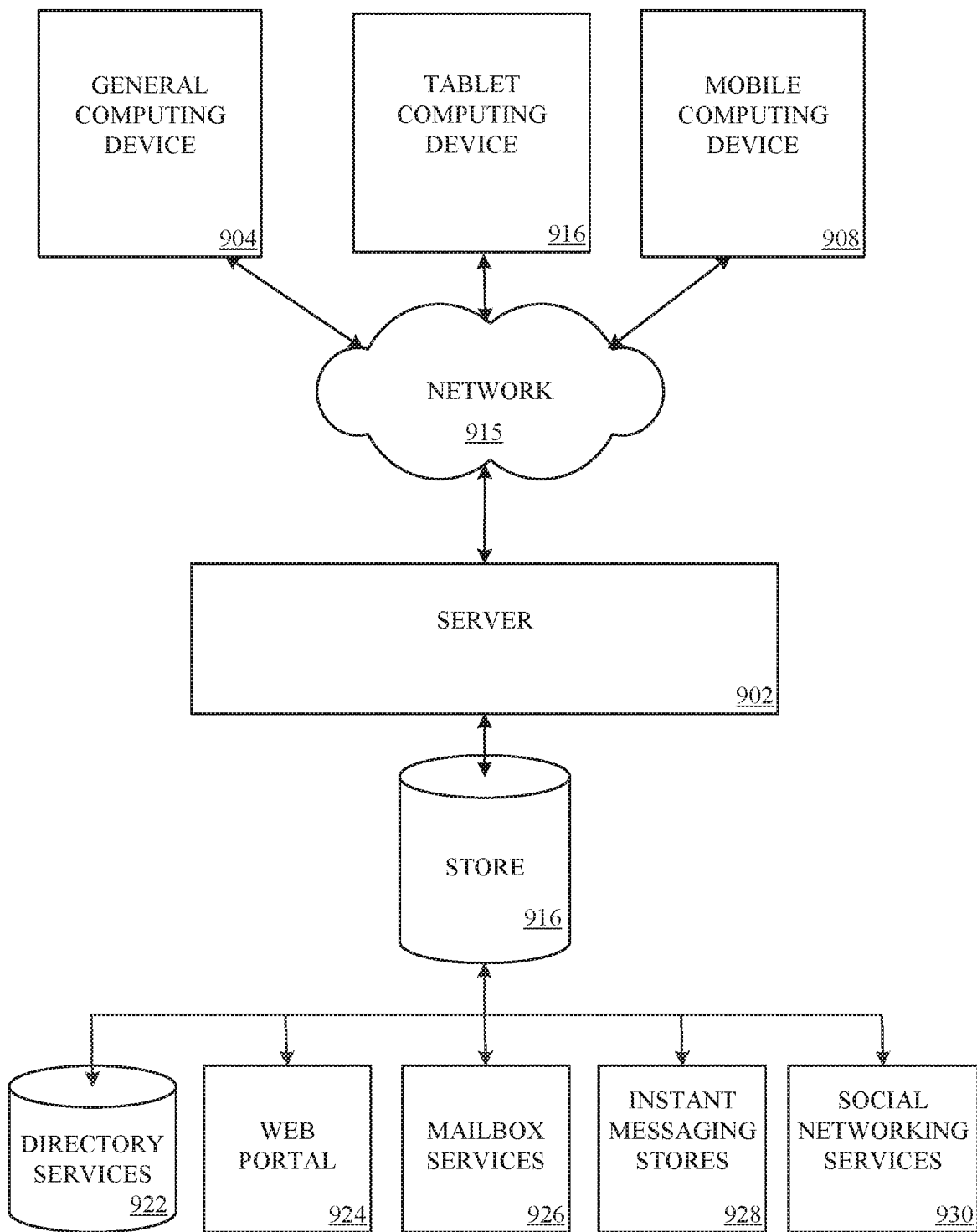
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data usable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for assisting with scheduling a meeting, the method comprising:
    receiving, by a digital assistant service, an electronic message, the electronic message sent from a scheduling user;
    detecting, from the electronic message, an intent to schedule a meeting;
    identifying an urgency level of the electronic message to the scheduling user;
    identifying a stress level of the scheduling user;
    determining, based on analyzing a response matrix, a response tone corresponding to the identified urgency level and the identified stress level, for responding to the scheduling user;
    responding to the scheduling user with an electronic message having the response tone corresponding to the identified urgency level and the identified stress level; and
    automatically performing, by the digital assistant service based on the analysis of the response matrix, a follow-up action for scheduling the meeting.

2. The method of claim 1, wherein the electronic message includes a temporal cue corresponding to a cut-off date when the scheduling user wants the meeting to be scheduled by.

3. The method of claim 2, wherein performing the follow-up action for scheduling the meeting comprises:
    scheduling the meeting closer to the current date when the identified urgency level is relatively high; and
    scheduling the meeting closer to the cut-off date when the identified urgency level is relatively low.

4. The method of claim 3, wherein the temporal cue corresponding to the cut-off date is identified, at least in part, via application of a sequence-to-sequence model to at least one sentence in the electronic message.

5. The method of claim 2, wherein the urgency level of the scheduling user's electronic message to the scheduling user is identified, at least in part, via application of a binary classification model to at least one sentence in the electronic message.

6. The method of claim 5, wherein the urgency level of the scheduling user's electronic message to the scheduling user is identified, at least in part, via facial cue analysis of the scheduling user.

7. The method of claim 1, wherein performing the follow-up action for scheduling the meeting comprises:
    sending a query to at least one potential meeting attendee for an available date and time for attending the meeting;
    not receiving a response from the potential meeting attendee for a threshold duration of time; and
    sending an additional follow-up message to the potential meeting attendee.

8. The method of claim 7, wherein the query comprises a first number of optional available dates and times for attending the meeting.

9. The method of claim 8, wherein the follow-up message comprises a second number of optional available dates and times for attending the meeting that is less than the first number of optional available dates and times for attending the meeting.

10. The method of claim 7, wherein the threshold duration of time is based on the identified urgency level of the scheduling user's electronic message to the scheduling user.

11. The method of claim 10, wherein the threshold duration of time is relatively high when relatively high urgency levels are identified, and the threshold duration of time is relatively low when relatively low urgency levels are identified.

12. The method of claim 1, further comprising prioritizing, in a queue comprising a plurality of other electronic messages, the electronic message for processing based on the identified urgency level of the scheduling user's electronic message to the scheduling user and an identified urgency level of at least one of the other electronic messages.

13. The method of claim 1, wherein the urgency level of the scheduling user's electronic message to the scheduling user is identified, at least in part, via application of one or more sentiment analysis models to the electronic message.

14. A system for assisting with scheduling a meeting, comprising:
    a memory for storing executable program code; and
    one or more processors, functionally coupled to the memory, the one or more processors being responsive to computer-executable instructions contained in the program code and operative to:
- receive, by a digital assistant service, an utterance from a scheduling user;
- detect, from the utterance, an intent to schedule a meeting;
- identify an urgency level of the utterance to the scheduling user;
- identify a stress level of the scheduling user;
- determine, based on analyzing a response matrix, a response tone corresponding to the identified urgency level and the identified stress level, for responding to the scheduling user;
- respond to the scheduling user in a response tone corresponding to the identified urgency level; and
- automatically perform, by the digital assistant service based on the analysis of the response matrix, a follow-up action for scheduling the meeting.

15. The system of claim 14, wherein the one or more processors are further responsive to the computer-executable instructions contained in the program code and operative to:
- prioritize, in a queue comprising a plurality of other utterances, the utterance for processing based on the identified urgency level of the scheduling user's utterance to the scheduling user and an identified urgency level of at least one of the other utterances.

16. The system of claim 15, wherein performing the follow-up action for scheduling the meeting comprises:
- querying at least one potential meeting attendee for an available date and time for attending the meeting;
- not receiving a response from the potential meeting attendee for a threshold duration of time; and
- sending an additional follow-up message to the potential meeting attendee.

17. A computer-readable storage device comprising executable instructions that, when executed by one or more processors, assists with scheduling a meeting, the computer-readable storage device including instructions executable by the one or more processors for:
- receiving, by a digital assistant service, an electronic message, the electronic message sent from a scheduling user;
- detecting, from the electronic message, an intent to schedule a meeting;
- identifying an urgency level of the electronic message to the scheduling user;
- identifying a stress level of the scheduling user;
- determining, based on analyzing a response matrix, a response tone corresponding to the identified urgency level and the identified stress level, for responding to the scheduling user;
- responding to the scheduling user with an electronic message having the response tone corresponding to the identified urgency level and the identified stress level; and
- automatically performing, by the digital assistant service based on the analysis of the response matrix, a follow-up action for scheduling the meeting.

18. The computer-readable storage device of claim 17, wherein the instructions are further executable by the one or more processors for:
- prioritizing, in a queue comprising a plurality of other electronic messages, the electronic message for processing based on the identified urgency level of the scheduling user's electronic message to the scheduling user and an identified urgency level of at least one of the other electronic messages.

19. The computer-readable storage device of claim 17, wherein in performing the follow-up action for scheduling the meeting, the instructions are further executable by the one or more processors for:
- querying at least one potential meeting attendee for an available date and time for attending the meeting;
- sending an additional follow-up message to the potential meeting attendee if a response from the potential meeting attendee is not received within a threshold duration of time, wherein the threshold duration of time is based on the identified urgency level of the scheduling user's electronic message to the scheduling user.

20. The computer-readable storage device of claim 17, wherein the electronic message includes a temporal cue corresponding to a cut-off date when the scheduling user wants the meeting to be scheduled by, and wherein in performing the follow-up action for scheduling the meeting, the instructions are further executable by the one or more processors for:
- scheduling the meeting closer to the current date when the identified urgency level is relatively high; and
- scheduling the meeting closer to the cut-off date when the identified urgency level is relatively low.

* * * * *